Dec. 15, 1925.
A. W. RYBECK
1,565,400
DRAFT MECHANISM
Filed April 16, 1923
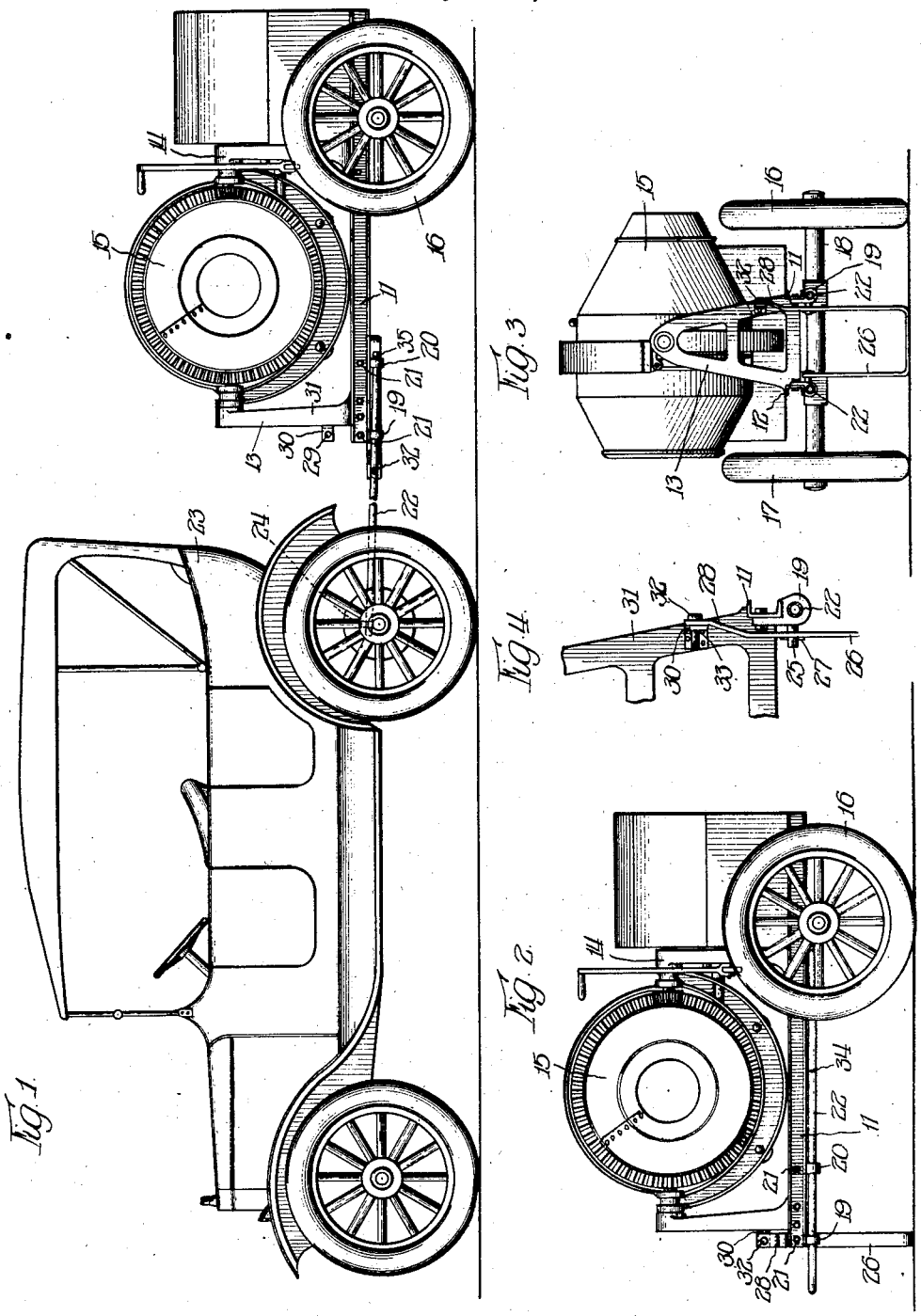
Witness:
G. Burkhardt.
Inventor:
Adolph W. Rybeck,
By Wilkinson Huxley Byron & Knight
Attys.

Patented Dec. 15, 1925.

1,565,400

UNITED STATES PATENT OFFICE.

ADOLPH W. RYBECK, OF MILWAUKEE, WISCONSIN, ASSIGNOR TO THE T. L. SMITH COMPANY, OF MILWAUKEE, WISCONSIN, A CORPORATION OF WISCONSIN.

DRAFT MECHANISM.

Application filed April 16, 1923. Serial No. 632,299.

*To all whom it may concern:*

Be it known that I, ADOLPH W. RYBECK, a subject of the Kingdom of Sweden, residing at Milwaukee, in the county of Milwaukee and State of Wisconsin, have invented certain new and useful Improvements in Draft Mechanism, of which the following is a specification.

This invention relates to a new and improved draft mechanism and more particularly to a draft mechanism and support adapted for use with industrial trailers.

A number of types of industrial machines, such, for example, as concrete mixers, are commonly mounted upon trailers adapted to be drawn behind motor or other vehicles in transporting the machines.

It is desirable to make these trailers in as inexpensive a manner as possible and to provide them with supporting means adapted to rigidly support them when in working position and to be readily moved upward to afford clearance for traveling. It is also desirable to provide draft mechanism which may be moved substantially within the contour of the trailer so as not to obstruct the persons working with a machine mounted on the trailer.

It is an object of the present invention to provide draft and supporting means of the character described, adapted for ready adjustment to traveling or halt position.

It is a further object to provide draft and supporting means adapted to be located substantially within the contour of the trailer when not in use. It is another object to provide such means which co-operate with each other in the traveling position.

It is also an object to provide means of this character which may be readily constructed at small cost, and which are simple in design, construction and operation.

Other and further objects will appear as the description proceeds.

I have illustrated a preferred embodiment of my invention in the accompanying drawings, in which—

Figure 1 shows a trailer equipped with my improvements connected to a vehicle for traveling;

Figure 2 is a side elevation of the trailer in the halt position;

Figure 3 is an end view of Figure 2 as seen from the left, a portion of the draft member being cut away for clearness; and Figure 4 is a fragmentary section illustrating the method of connection of the adjustable support.

The trailer comprises the longitudinal frame members 11 and 12 which in the present case are connected by transverse members 13 and 14 which also serve to support the concrete mixer drum 15. The rear end of the trailer is supported upon wheels 16 and 17 connected by axle 18. The concrete mixer shown forms no part of the present invention and need not be described in detail.

The guide members 19 and 20 are secured to the longitudinal frame members 11 and 12 by means of bolts 21. These members are provided with openings adapted to slidably receive the draft means 22 which is in the form of a U-shaped tubular member. The arms of the U extend into the members 19 and 20, running parallel to and below the side frame members 11 and 12. The cross portion of the U extends in front of the trailer.

As shown in Figure 1, the cross portion is adapted to be connected to the pulling vehicle 23 by any means such as the pin 24. When in the halt position, the draft member 22 is thrust inwardly under the trailer frame so that it is substantially within the trailer contour, its U-shaped end projecting but a short distance from the frame. Ample clearance is thus provided for working with the concrete mixer or other machine carried by the trailer.

The members 19 are provided with inwardly extending lugs 25 upon which are pivotally fitted the arms of the U-shaped support member 26. The arms are retained by cotter pins 27. One of the arms of the member 26 is provided with an extended portion 28 which latter has an opening therethrough adapted to register with an opening 29 formed in the lug 30 carried by the cross frame member 13. The extension 28 and lug 30 are secured together by the pin 32 and cotter pin 33.

When the trailer is in the traveling position, the support 26 is swung to the horizontal position after removing the cotter pin 33 and pin 32, and the pin 32 is passed through an opening 34 in the adjacent leg of the U-shaped draft member, and is retained in place by the cotter pin. This connection serves the joint purpose of maintaining the support in the horizontal position to provide clearance for traveling and also maintains the draft member in extended position. The trailer is thus prevented from running up the draft member if the pulling vehicle is suddenly halted. Also the connection serves to assist in transmitting the draft pull to the trailer frame. Pins 35 pass through the extreme ends of the legs of the U-shaped draft member in order to prevent complete removal of the draft member, and to transmit the draft to the trailer through the lugs 20.

The construction shown affords an extremely simple and relatively inexpensive support for the trailer when halted together with draft means which may be thrust under the trailer and out of the way when the vehicle is halted. A single fastening serves to maintain both mechanisms in the proper travel position. While the construction has been shown applied to a trailer carrying a concrete mixer, it is obviously independent of the apparatus carried by the trailer which may be used for any purpose.

I claim:

1. In a trailer construction, a frame, wheels supporting one end of the frame, and an adjustable support having a U-shaped portion adapted in one position to engage the ground, and an oppositely extending arm, and means adapted to secure the arm to maintain the support selectively in horizontal or vertical position.

2. In a trailer construction, a frame, wheels supporting one end of the frame, a draft member slidably associated with the frame, and an adjustable support pivotally connected to the frame, a portion of the support being adapted in the traveling position to be connected to the draft member to limit movement of the draft member relative to the frame.

3. In a trailer construction, a frame, wheels supporting one end of the frame, a draft member slidably associated with the frame, and an adjustable support pivotally connected to the frame, a portion of the support being adapted in the traveling position to be connected to the draft member to limit movement of the draft member relative to the frame, said portion of the support being adapted to be connected to the frame to maintain the support in vertical position to support the end of the frame when halted.

Signed at Milwaukee, Wisconsin, this 12th day of April, 1923.

ADOLPH W. RYBECK.